US007233477B2

(12) United States Patent
Hasegawa et al.

(10) Patent No.: US 7,233,477 B2
(45) Date of Patent: Jun. 19, 2007

(54) DATA ERASING DEVICE USING PERMANENT MAGNET

(75) Inventors: Hiroshi Hasegawa, Higashine (JP); Hisato Suzuki, Higashine (JP); Hiroyuki Uematsu, Higashine (JP)

(73) Assignee: Fujitsu Limited, Kawasaki (JP)

( * ) Notice: Subject to any disclaimer, the term of this patent is extended or adjusted under 35 U.S.C. 154(b) by 478 days.

(21) Appl. No.: 10/656,113

(22) Filed: Sep. 8, 2003

(65) Prior Publication Data

US 2004/0051989 A1 Mar. 18, 2004

(30) Foreign Application Priority Data

Sep. 17, 2002 (JP) ............................ 2002-270421

(51) Int. Cl.
*H01F 13/00* (2006.01)

(52) U.S. Cl. ...................................................... 361/151

(58) Field of Classification Search ................. 361/151
See application file for complete search history.

(56) References Cited

U.S. PATENT DOCUMENTS 3,711,750 A * 1/1973 Huffman et al. ............ 361/151
6,570,727 B1 * 5/2003 Tamura et al. ................ 360/66

FOREIGN PATENT DOCUMENTS

| | | |
|---|---|---|
| JP | 36-13486 | 8/1961 |
| JP | 58-118513 | 8/1983 |
| JP | 02-140605 A | 11/1990 |
| JP | 7-29106 | 1/1995 |
| JP | 3063860 | 7/2000 |
| JP | 2001-312802 | 11/2001 |
| JP | 2001-331904 | 11/2001 |
| JP | 2001-331904 A | 11/2001 |

* cited by examiner

*Primary Examiner*—Brian Sircus
*Assistant Examiner*—Lucy Thomas
(74) *Attorney, Agent, or Firm*—Westerman, Hattori, Daniels & Adrian, LLP.

(57) ABSTRACT

In a portable data erasing device, to prevent data leaks from magnetic disk devices to be disposed, data is erased by a simple operation. The data erasing device using a magnetic field generated by permanent magnets to erase data comprises a sliding tray, a main body and a swinging tray. The sliding tray is movable into and out from the main body, two permanent magnets, adjacently arranged so that the north and south poles thereof have mutually attracting polarities, are attached to the front end of the sliding tray. One end of the swinging tray is fixed to the upper surface of the main body by a shaft, so that a magnetic disk device can be mounted and swung on top of the main body. While the sliding tray is extracted stepwise from the main body, the magnetic disk device can be swung, and data on the magnetic disks erased.

17 Claims, 14 Drawing Sheets

DATA ERASING DEVICE USING PERMANENT MAGNET

CROSS REFERENCE TO RELATED APPLICATION

This application claims priority from, and incorporates by reference the entire disclosure of, Japanese patent application No. 2002-270421, filed on Sep. 17, 2002.

BACKGROUND OF THE INVENTION

1. Field of the Invention

The present invention relates to a data erasing device using permanent magnets. In particular, it relates to a portable data erasing device that can easily erase a hard disk device, used in a computer as a memory device, using permanent magnets.

2. Description of the Related Art

In the prior art, in computers such as personal computers and the like, recording media for recording programs and data have become necessary, and in recent years, hard disk devices using a disk coated with a magnetic material have become popular as such recording media. Such hard disk devices are built into the computer or are used as external hard disk devices connected to the computer via a cable, data being written into at least one internal disk via at least one head. The storage capacity of these types of hard disks has been steadily increasing over the years.

Meanwhile, personal computers are being sold in new formats year by year along with advances in the operating systems that drive them, the processing speed of CPUs (central processing units), the expansion of communication functions, the capacity of hard disk devices, and the like, so that there is a tendency for old personal computers to be replaced with new personal computers within a short period of time.

Hard disk devices built into old computers that have been disposed of when replaced by new computers, and hard disk devices with small memory capacities which have been disposed of when replaced by new hard disk devices with larger memory capacities, still contain large amounts of various types of data which were written into data is data, such as personal information, internal company information and the like, that must not be leaked to a third person. In such cases it is common to perform an erasing process using computer software to erase data on the hard disk device prior to disposal.

However, this data erasing process is simply a process which allows data to be written over regions of the disks in the hard disk device in which data has been previously stored. Consequently, prior art data erasing processes did not completely erase all of the data which had been stored on the disk. Thus, in hard disk devices in which data has not been completely erased in this manner, a third person, using special software, can read the remaining data.

In this regard, as methods for completely erasing data recorded on a hard disk device, methods of forcefully erasing data, such as writing random data on the entire surface of the magnetic disks in the hard disk device or passing the magnetic disks of the hard disk device through a powerful magnetic field such as that generated by a permanent magnet or the like, are known. With respect to the first method, the existence of software for service organizations and retailers to perform this method is well known. Also, with respect to the second method, data erasing devices for controlling the strength of a magnetic field applied to the spindle motor of the hard disk device and erasing data by applying a strong magnetic field to the magnetic disks is known (for example, refer to the claims, FIG. 1, and FIG. 2 of Japanese Unexamined Patent Application No. 2001-331904).

Since the object of the data erasing device disclosed in Japanese Unexamined Patent Application No. 2001-331904 is to reuse the magnetic disks, data on the magnetic disk is deleted by passing one end of the magnetic disk device through a magnetic field between permanent magnets in a state where the magnetic disk is rotated by the spindle motor.

The method of writing random data on the entire surface of the magnetic disks of the hard disk device as described above has a problem in that writing the data takes time due to the large capacity of the hard disk device, and has an additional problem in that the disposal cost increases when a service organization is asked to erase the data. On the other hand, in the data erasing device disclosed in Japanese Unexamined Patent Application No. 2001-331904 for erasing data by means of magnetic saturation, by passing the magnetic disks through a strong magnetic field, equipment for rotating the spindle motor is necessary, leading to the problem of an increase in the device size. Also, there is a problem in that if, for some reason, the spindle motor does not rotate the data will not be completely erased.

In this data erasing device disclosed in Japanese Unexamined Patent Application No. 2001-331904, consideration has not been given to erasing data with the object of preventing data leakage from the disposed hard disk device, and neither has consideration been given to reusing the magnetic disks.

SUMMARY OF THE INVENTION

The object of the present invention is to provide a portable and convenient data erasing device, using permanent magnets, that can reliably erase data with a simple operation, for preventing leakage, after disposal, of data recorded on a magnetic disk device or other magnetic recording medium such as a hard disk device.

The present invention, in order to achieve the above object, is disclosed as the following first to third embodiments.

The first aspect of the present invention is a data erasing device for erasing data recorded on a magnetic recording medium using a magnetic field generated from permanent magnets, comprising a main body case for housing a magnetic recording medium on an upper surface, a magnetic field generating source formed by arranging two permanent magnets each having one of a north pole and a south pole above a ferromagnetic plate so that they have mutually attracting polarities, a first transferring member that can move the magnetic field generating source in a predetermined direction inside the main body case, and a second transferring member that can move a magnetic recording medium in a direction substantially perpendicular to a movement direction of the magnetic generating source on the upper surface of the main body case.

In the first aspect of the present invention, a structure can be obtained in which the magnetic field generating source is provided with the ferromagnetic plate underneath, in the first transferring member such that the generated magnetic field reaches the upper space of the main body case, the first transferring member is attached to the main body case and is movable in a stepwise manner with respect to the main body case so that the magnetic field is applied uniformly within a predetermined range on the upper surface of the main body case, the second transferring member is formed comprising a frame that can house the magnetic recording medium in a central portion of the main body case, with the magnetic recording medium as an upper body held on the upper surface of the main body case, one end of this frame being rotatably fixed on the upper surface of the main body case by means of a rotating axle and, as well as the second transfer member being slidable around the rotation axle in a state where the magnetic recording medium is housed within the frame, after the second transfer member has slid a predetermined number of times, the deposition of the first transfer member sequentially changes in a stepwise manner and the second transfer means slides only the predetermined number of times in each step.

In the data erasing device of the first aspect, as the size of the permanent magnets for erasing data recorded on magnetic disks incorporated in the magnetic recording device can be decreased in size, the weight and the cost of the data erasing device can be reduced.

The second aspect of the present invention is a data erasing device for erasing data recorded on a magnetic recording medium using a magnetic field generated from permanent magnets, comprising a magnetic field generating source formed by arranging two permanent magnets each having one of a north pole and a south pole above a ferromagnetic plate so that they have mutually attracting polarities, a main body case in which the magnetic field generating source is internally attached to the ferromagnetic plate with the ferromagnetic plate thereabove, a path provided in the main body case perpendicular to the magnetic field generated by the magnetic field generating source, and a tray that is of a size that, as well as being able to house the magnetic recording medium, can reciprocally move within the main body case along the path provided in the main body case.

In the second aspect, the magnetic field generating source is preferably of a structure that is movable in a direction perpendicular to the central axis of the path provided in the main body case.

In the data erasing device of the second aspect, data recorded on the magnetic disks incorporated in a magnetic recording device can be erased with a simple operation.

A third aspect of the present invention is a carrying case which allows the data erasing devices of the first and second aspects to be stored and transported, and comprises a lower case that includes casters in a lower portion and handles in an upper portion thereof, an upper case which can cover the lower case, a cushioning material that is packed into the lower case and the upper case, and an indented portion provided of housing the data erasing device.

In the carrying case of the third aspect, the data erasing device of the first and second aspects can be easily transported.

BRIEF DESCRIPTION OF THE DRAWINGS

The present invention is illustrated by way of example without being limited by the figures of the accompanying drawings in which like references indicate similar elements. Note that the following figures are not necessarily drawn to scale.

DESCRIPTION OF THE PREFERRED EMBODIMENTS

Embodiments of the present invention will be explained in detail based on specific examples, with reference to the enclosed drawings.

Figures 1A, 1B:
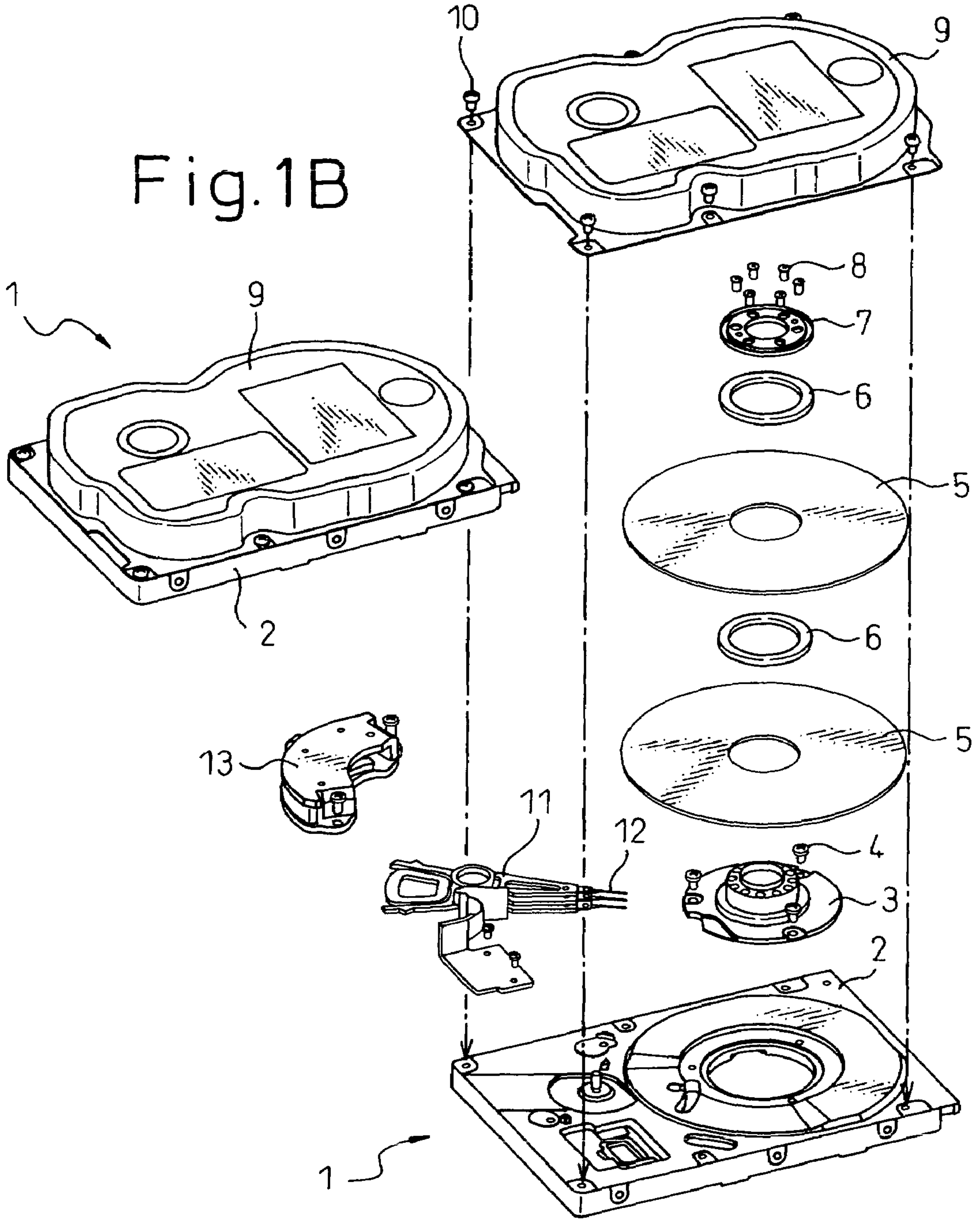
FIG. 1A is a partial perspective view of a magnetic disk device from which data is to be erased by the data erasing device of the present invention.
FIG. 1B is a perspective view of the magnetic disk device shown in FIG. 1A in an assembled state.

FIG. 1A is a partial perspective view of a magnetic disk device 1 from which data is to be erased by the data erasing device of the present invention. The magnetic disk device 1 is a hard disk device, and is sealed by an aluminum alloy base 2 and cover 9. A spindle motor 3 is attached to the top of the base 2 by screws 4. At least one magnetic disk 5 is fixed to the spindle motor 3 via a clamp 7 by means of screws 8. The magnetic disks 5 are a disk shaped recording medium for recording data and the number of magnetic disks 5 fixed to the spindle motor 3 is determined by the specifications of the magnetic disk device 1. Spacers 6 are inserted between each of the magnetic disks 5 and between the magnetic disks 5 and the clamp 7.

Also, among the components in proximity with the magnetic disk 5 above the base 2, an actuator 11 is slidably attached. At the tip of the actuator 11, a head portion 12 comprising heads for writing data into the magnetic disks 5 or reading data from the magnetic disks 5 is provided. Also, the end portion of the actuator 11 opposite the head portion 12B is driven by a voice coil motor (VCM) 13 similarly fixed to the base 2. After the components described above are attached to the top of the base 2, the cover 9 is attached to the base 2 by screws 10, so that it is in the state shown in FIG. 1B.

Figure 2:
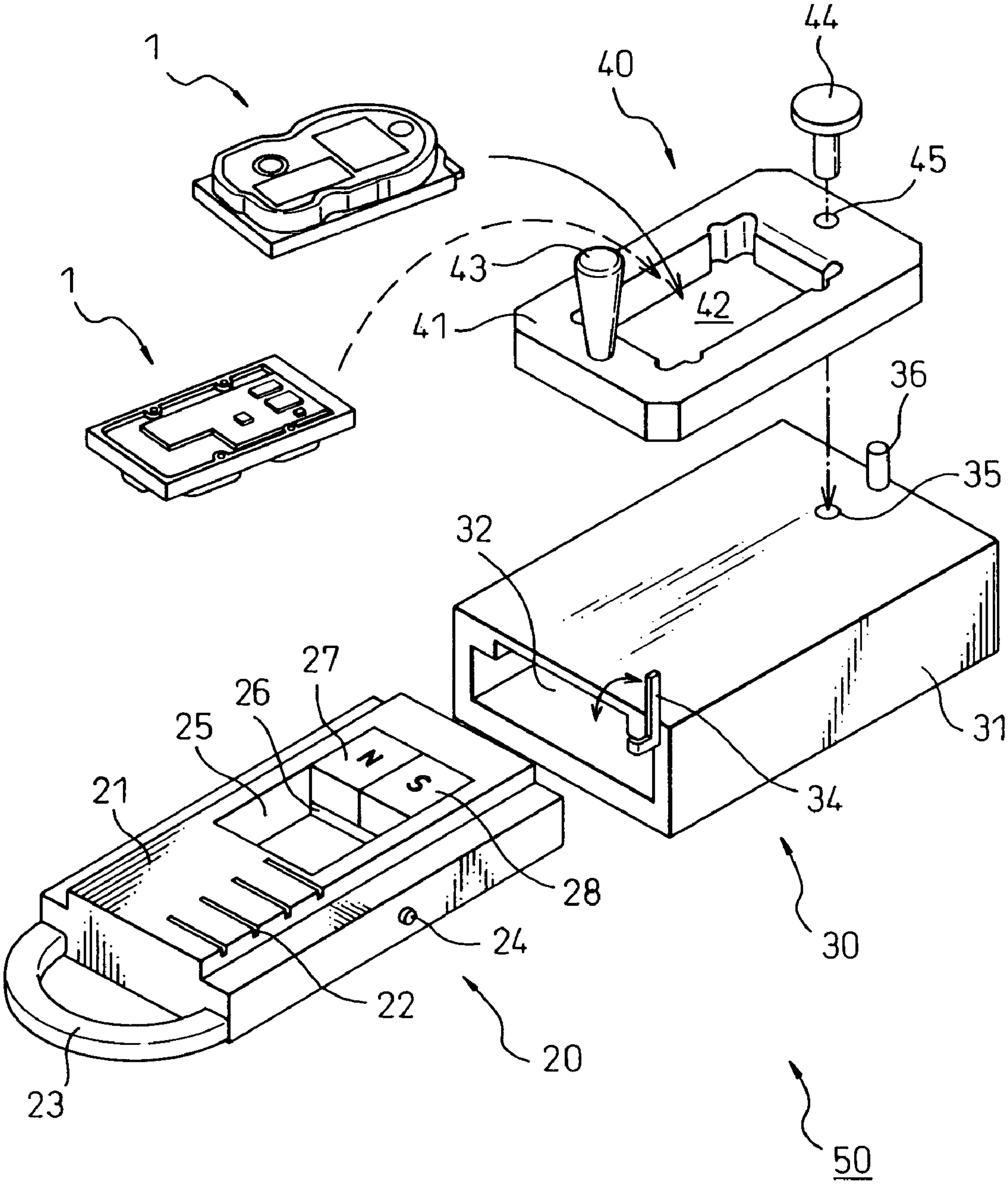
FIG. 2 is a partial perspective view showing the structure of the data erasing device of a first embodiment of the present invention.

FIG. 2 shows part of the structure of the data erasing device 50 of a first embodiment of the present invention. The data erasing device 50 of the first embodiment comprises a sliding tray 20, a main body 30, and a swinging tray 40. The data erasing device 50 is shown with its front end at the left of the drawing, and its rear end at the right. Thus, in the first embodiment, the left sides of the sliding tray 20, main body 30, and swinging tray 48 will be described as the front ends, and the right sides will be described as the rear ends.

The sliding tray 20 is constructed so as to be slidable with respect to the main body 30. For this reason, the cross sectional shape of a base 21 in the direction perpendicular to the sliding direction is uniform. A handle 23 for sliding the sliding tray 20 is provided at the front end of the base 21. Grooves 22, to be described later, for defining a stepwise sliding position of the sliding tray 20 are provided on the upper surface at the front end of the base 21 on the handle 23 side. The number of these grooves 22 in the first embodiment is four. Also, a permanent magnet attachment hole 25 is provided in the portion of the base 21 in proximity with and behind the grooves 22. Two permanent magnets (hereafter referred to simply as magnets) 27 and 28 attached to a yoke 26 are provided at the rear of the magnet attachment hole 25. Also, a stopper 24, to be described later, protrudes from the side of the base 21.

The main body 30 is constructed from a box shaped case 31, with an indented portion 32 for receiving the sliding tray 20 provided at the front end thereof. The cross section of the indented portion 32 has the same cross sectional shape as the base 21 of the sliding tray 20. In the present embodiment this cross sectional shape is a convex shape. Also, a latch lever 34 is rotatably provided in a predetermined position at the front end of the case 31. The tip of this latch lever 34 is made to fit into the grooves 22 of the sliding tray 20. Further, an attachment hole 35 is provided in the upper surface of the case 31 for attaching the swinging tray 40. In addition, a stopper 36 is provided protruding from the rear end of the upper surface of the case 31. This stopper 36 is for defining the swing limit of the swinging tray 40.

A stopper 24 is provided protruding from the side surface of the sliding tray 20 and, therefore, if the cross sectional shape of the indented portion 32 is the same as the cross sectional shape of the base 21 of the sliding tray 20, the sliding tray 20 cannot be inserted into the indented portion 32 from the front end of the case 31. The case 31 of the main body 30 is of an assembled type, so that when the sliding tray 20 is actually inserted into the indented portion 32, the side panel of the case 31 is firstly removed, then after the sliding tray 20 is housed In the case 31, the removed side face is reattached.

The swinging tray 40 is provided in a rectangular frame 41 in the central portion of which a medium housing hole 42 is provided, and a clip 43 is provided protruding from the upper surface of the front end of this frame 41. Also at the rear end of this frame 41, an attachment hole 45 is provided for rotatably attaching this frame 41 to the upper surface of the main body 30 by means of a pin 44. The magnetic disk device 1 shown in FIG. 1B is set in the medium housing hole 42 in either an upright state or an inverted state. Also, the swinging tray 40 is rotated around the pin 44 by means of an external force applied to the clip 43. The stopper 36 provided protruding from the upper surface of the case 31 of the main body 30 is for defining a swing limit of the swinging tray 40.

Figure 3A:
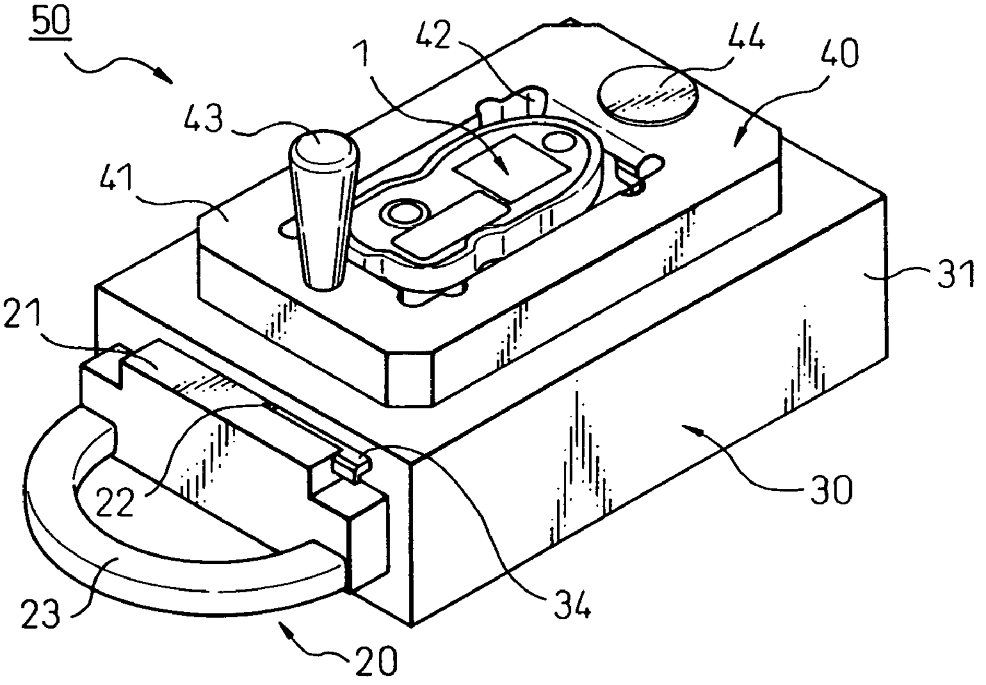
FIG. 3A is a perspective view of the data erasing device shown in FIG. 2 in a state where it is assembled and a sliding tray is fully inserted into the main body.

FIG. 3A is a perspective view of the data erasing device 50, shown in FIG. 2, in a state where it is assembled and a sliding tray 20 is fully inserted into the main body 30. In this state, the foremost groove among the grooves 22 provided in the upper surface of the base 21 of the sliding tray 20 is exposed outside the case 31. Then, when the latch lever 34 is rotated and the grooves 22 are engaged, the sliding tray 20 is locked in a state where it is completely enclosed in the main body 30.

Figure 3B:
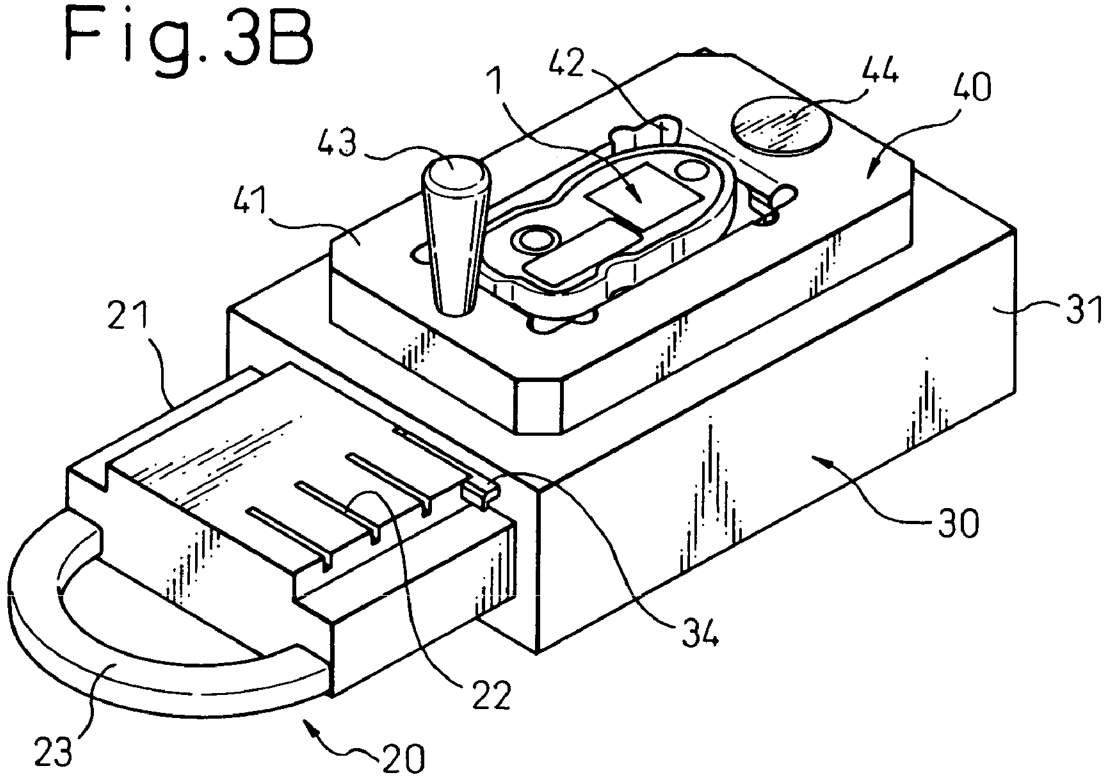
FIG. 3B is a perspective view of the data erasing device showing a state where the sliding tray shown in FIG. 3A is extracted to the maximum extent.

FIG. 3B shows a state where the sliding tray 20 shown in FIG. 3A is extracted from the main body 30 to the maximum extent. In this state, all four grooves 22 provided in the upper surface of the base 21 of the sliding tray 20 are exposed outside the case 31. Consequently, if the latch lever 34 is rotated and the rearmost groove 22 engaged, the sliding tray 20 is fixed in a state where it protrudes from the main body 30 to the maximum extent. The sliding tray 20 can be adjusted to 4 extraction positions, with respect to the main body 30, between the state shown in FIG. 3A and the state shown in FIG. 3B.

Figure 4A:
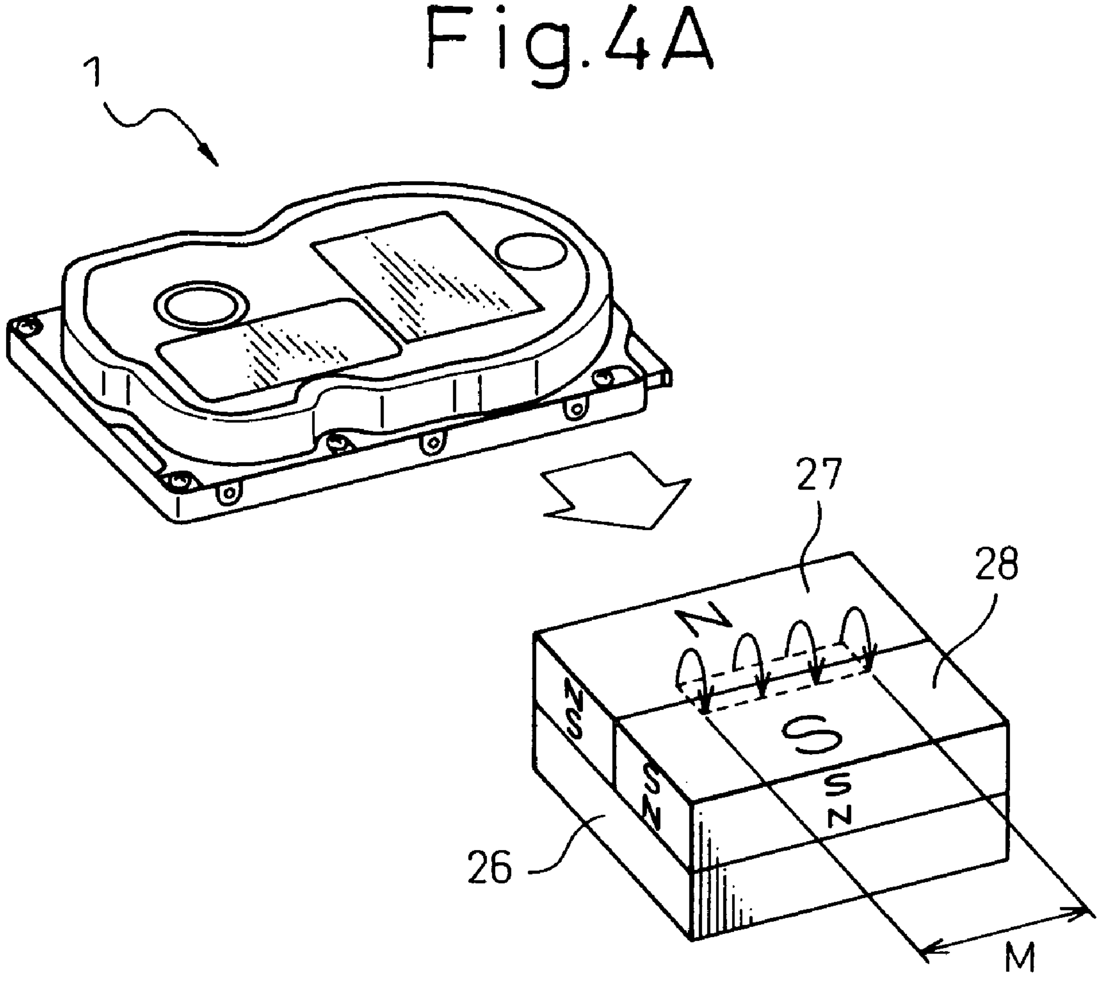
FIG. 4A is a diagram for explaining the principle by which data in the magnetic disk device is erased by the data erasing device of the present invention.
Figure 4B:
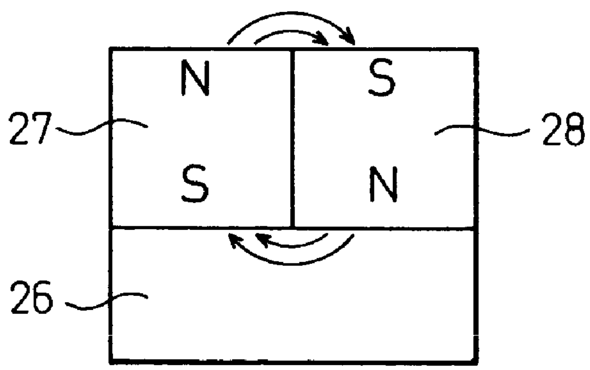
FIG. 4B is a diagram illustrating the magnetic flux direction of the magnets shown in FIG. 4A.

FIG. 4A explains the principle by which data in the magnetic disk device 1 is erased by the data erasing device 50 of the present invention, and FIG. 4B illustrates the magnetic flux direction of the magnets 27 and 28 shown in FIG. 4A. In the present invention, the magnets 27 and 28 are provided above the yoke 26. The magnet 27 is arranged so that its upper side is a north pole and its lower side is a south pole, and the magnet 28 is conversely arranged so that its upper side is a south pole and its lower side is a north pole. In other words, the magnets 27 and 28 are arranged adjacent to each other having mutually attracting polarities, and function as magnetic field generating means. Seen as magnetic field generating means, the differing poles at each of the upper and lower surfaces are adjacent to each other.

The magnetic flux from the north pole of the magnet 27 returns to the south pole of the magnet 28 through external space if there is no yoke 26. On the other hand, where the yoke 26 is attached to the lower sides of the magnets 27 and 28, magnetic flux from the north pole of the magnet 28 returns to the south pole of the magnet 27 through the yoke 26, without leaking into an external space. The function of the yoke 26 is to increase (by a mirror effect) the magnetic flux density at the side where the yoke 26 is not provided, and to control unnecessary magnetic flux leakage into external space at the side with the yoke 26 is provided. Also, where the magnets 27 and 28 are arranged above the yoke 26 as described above, the magnetic flux that returns to the magnet 28 from the magnet 27 via external space is known to be strongest in the central portion m of the portion where the magnet 27 and the magnet 28 abut each other, as indicated by the arrows in FIG. 4A. This portion will be referred to as the maximum magnetic flux region m. The yoke 26 need not have an integral structure, but can be assembled from separate components.

Figure 5A:
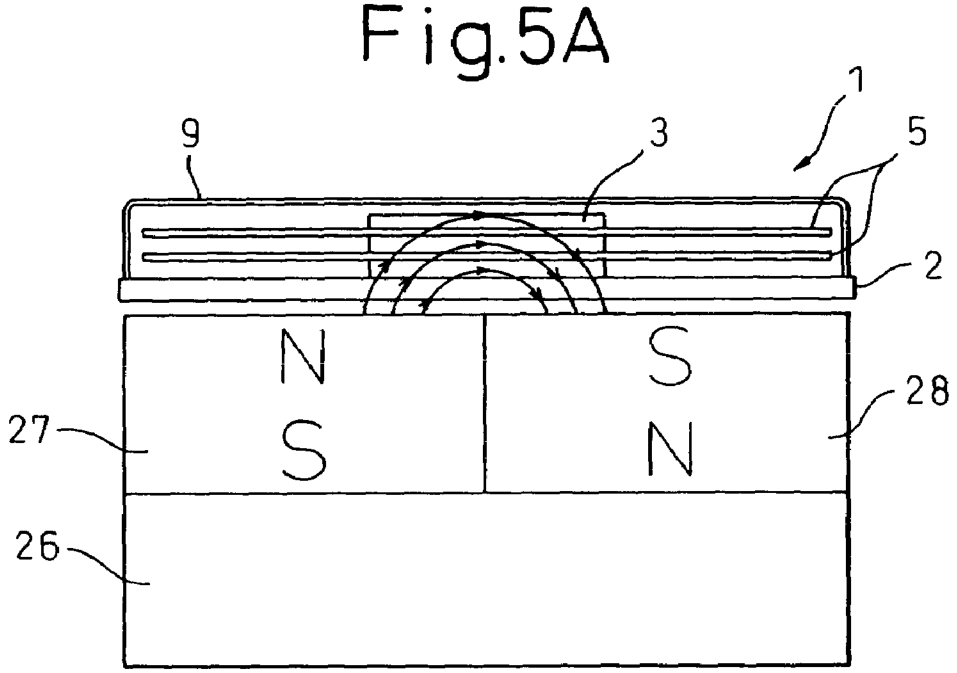
FIG. 5A is a sectional view showing a state in which data in the magnetic disk device is being erased by the data erasing device of the present invention.
Figure 5B:
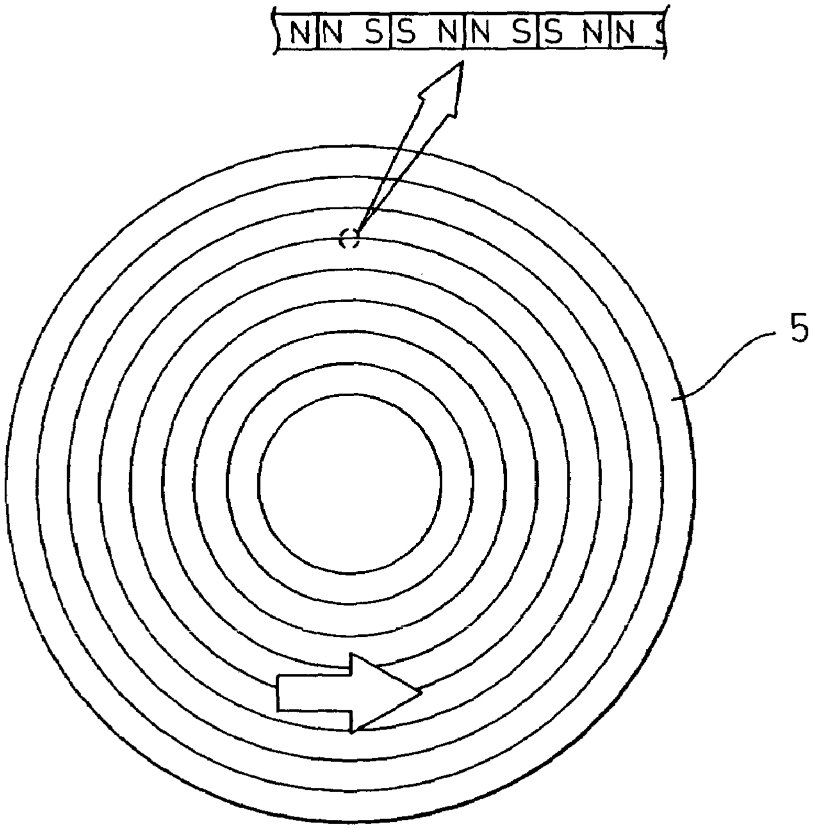
FIG. 5B is a view illustrating the direction in which data recorded in the magnetic disk device is magnetized.

Meanwhile, data in a magnetic disk 5, as shown in FIG. 5B, employs a horizontal magnetic recording method. Consequently, in order to erase data recorded on the magnetic disk 5, it is preferable to utilize a magnetic field horizontal to the magnetic disk 5. In the present invention, as shown in FIG. 5A, in order to erase data stored in the magnetic disk 5 attached to the spindle motor 3 of the magnetic disk device 1, the magnetic disk device 1 is placed above the magnets 27 and 28 and both are moved in a forward-backward direction (Y direction) and right-left direction (x direction) relative to each other. In this manner, using the horizontal component of the magnetic field region generated by the magnets 27 and 28, the data stored on the magnetic disk 5 can be erased.

The strength of the magnetic field for erasing data recorded on the magnetic disk 5 must be greater than the coercive force of the magnetic disk 5. Thus, in order to reliably erase data recorded on a magnetic disk 5 having a strong coercive force, the magnets 27 and 28 should preferably be Nd—Fe—B type magnets having high magnetic flux density. On the other hand, unnecessary magnetic flux leakage to the outside from the yoke 26 of the magnets 27 and 28 should preferably be controlled. Thus, as the material of the yoke 26, a ferromagnetic body such as JIS SS400, for example, is preferable.

Also, the maximum magnetic flux region M of the magnet 27 and the magnet 28 preferably has a structure that reliably passes over the data erasing portion of the magnetic disk 5. Further, where a plurality of magnetic disks 5, as shown in FIG. 5A, are provided in the magnetic disk device 1, it is difficult to erase data on the magnetic disk 5 furthest from the magnets 27 and 28. Therefore, in such a case, data recorded on the magnetic disks 5 can be reliably erased by inverting the magnetic disk device 1 and repeating the data erasing operation.

In the present invention, as described above, data recorded on the magnetic disks 5 provided inside the cover 9 of the magnetic disk device 1 shown in FIG. 1A is erased using a magnetic field attained by the arrangement of the magnets 27 and 28. In this case, in order for the magnetic field to extend over the entire surface of the magnetic disks 5, the size of the magnets 27 and 28 can be increased. However, if the magnets 27 and 28 are made large enough for the magnetic field to cover the entire surface of the magnetic disks 5, the weight of the magnets 27 and 28 becomes extremely large, making them difficult to carry, and the cost of the magnets increases. Also, in order for the limited magnetic field to extend over the entire surface of the magnetic disks 5, although a method of rotating the magnetic disks 5 using a spindle motor 3 has been considered, if the motor does not rotate the data on the magnetic disks 5 is not completely erased, therefore there is a security problem.

In the data erasing device 50 of the first embodiment of the present invention, as explained with regard to the structure shown in FIG. 2, FIG. 3A and FIG. 3B, while the sizes of the magnets 27 and 28 are reduced as much as possible, the magnets 27 and 28 and the magnetic disks 5 are moved in relation to each other so that the magnetic field generated by the magnets 27 and 28 extends over the entire surface of the magnetic disks 5. In other words, this is realized by moving the magnets 27 and 28 in the forward-backward direction (Y direction) of the data erasing device 50 by means of the sliding tray 20, and moving the magnetic disks 5 in a substantially right-left direction (Y direction) with respect to the magnets 27 and 28 by means of the swinging tray 40.

The method of completely erasing data recorded on magnetic disks 5 in a magnetic disk device 1 using the data erasing device 50 of the first embodiment of the present invention will be explained using FIGS. 6A to 8.

Figure 6A:
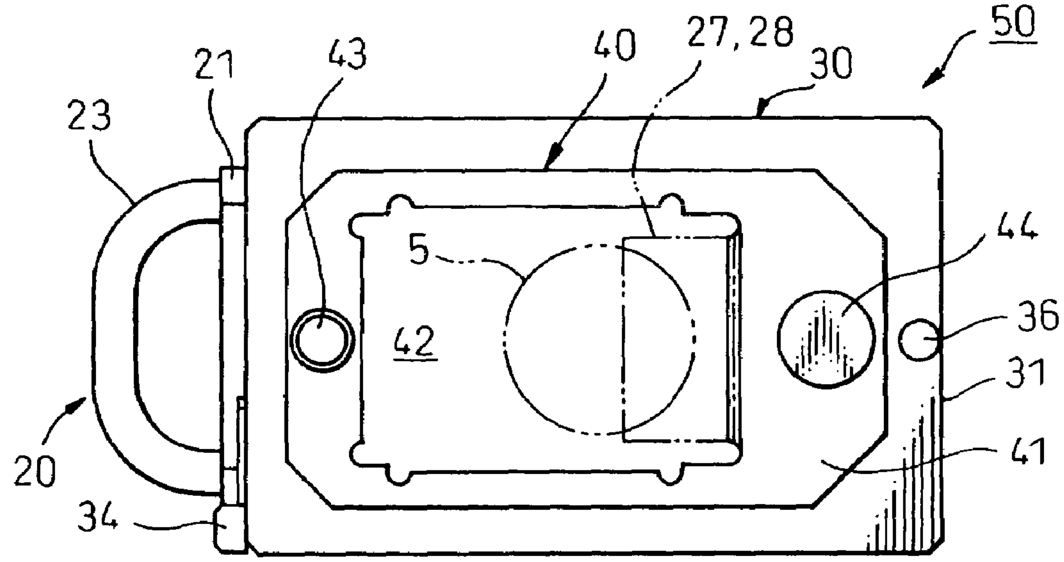
FIG. 6A is a plan view of the data erasing device shown in FIG. 3A.
Figure 7:
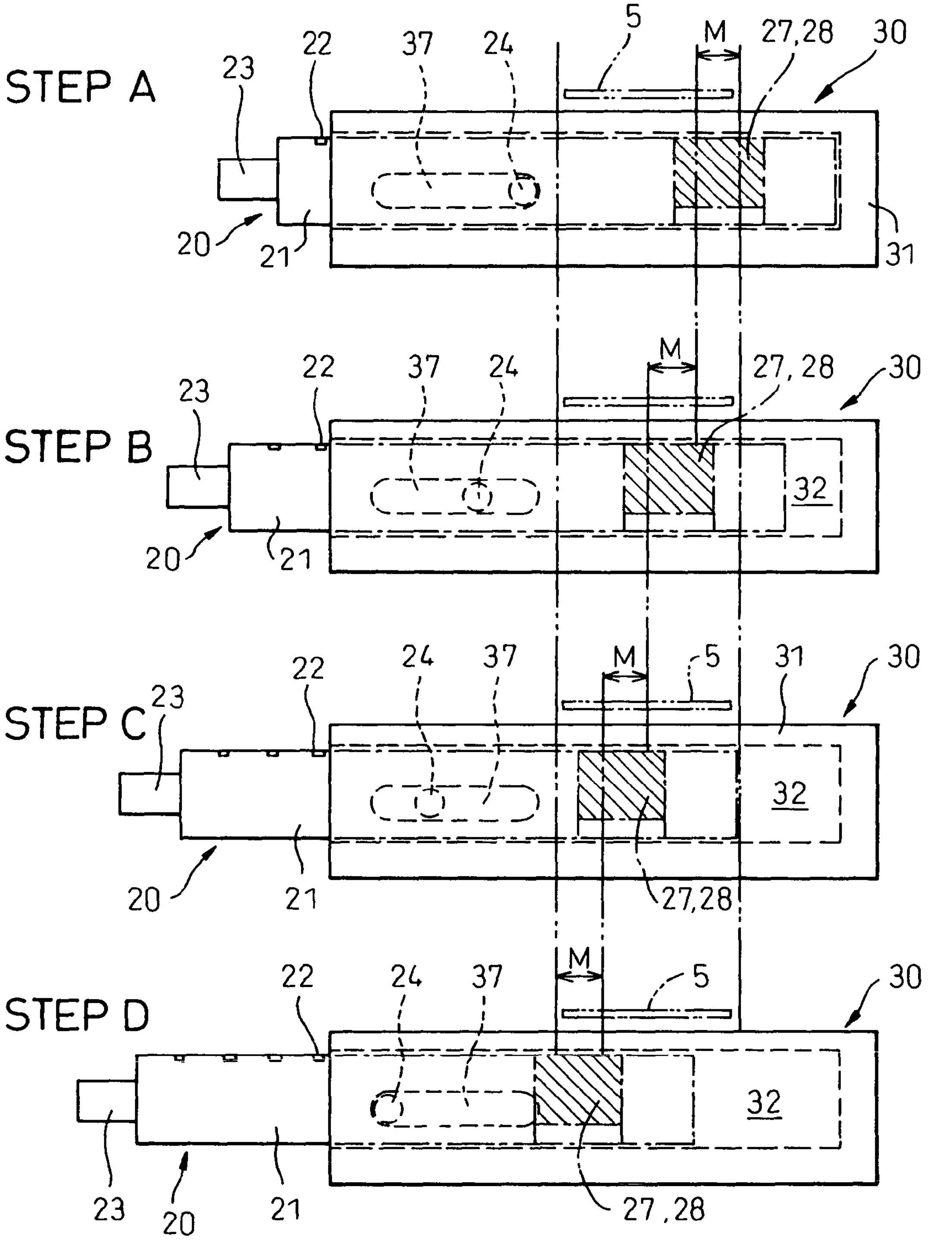
FIG. 7 is a diagram for explaining a state wherein, in the data erasing device of the first embodiment, the sliding tray is pulled in 4 steps from step A to step D, and for illustrating the position of the maximum magnetic field of the magnets in each of these steps.
Figure 8:
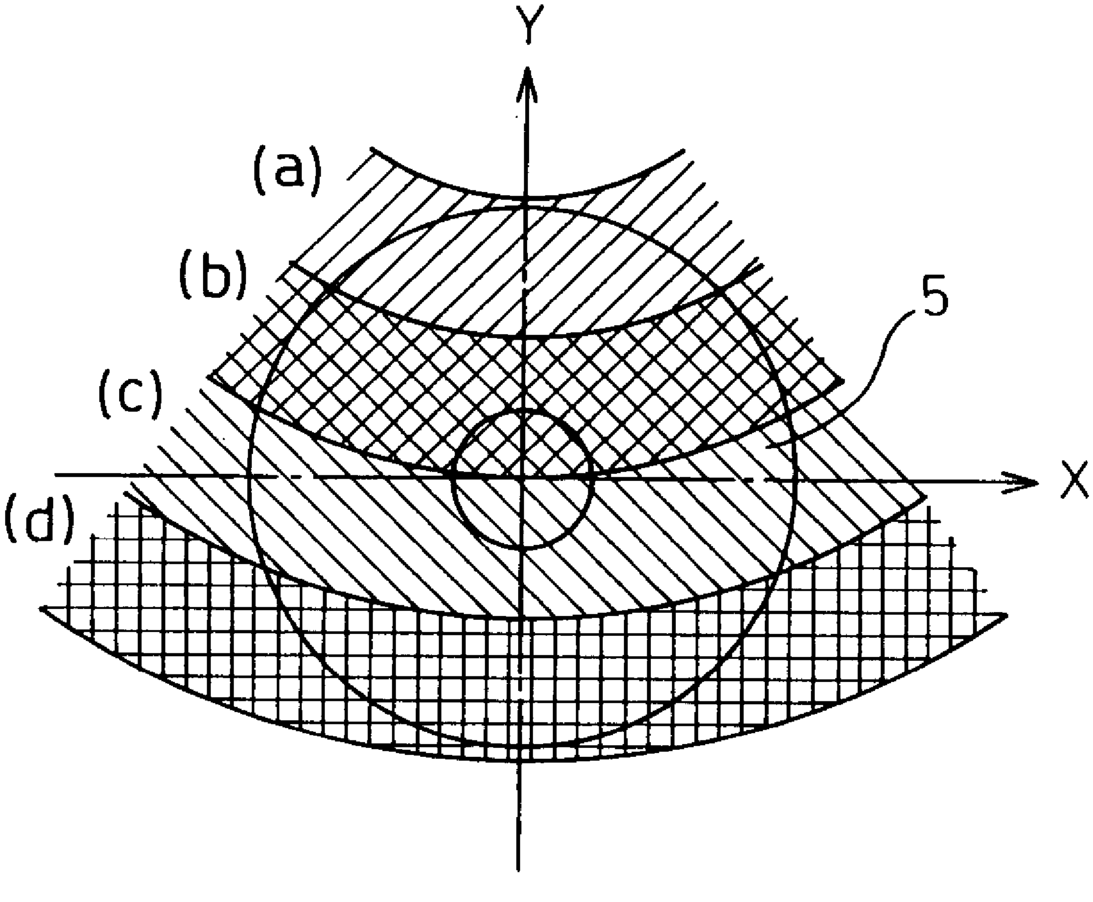
FIG. 8 is a diagram for explaining relative changes in the state of a magnetic disk and the maximum magnetic field of the magnets in the first embodiment of the present invention.

FIG. 6A is a plan view of the data erasing device 50 in the state shown in FIG. 3A, and shows the relationship between the position of the magnets 27 and 28 in the sliding tray 20 and the position of the magnetic disks 5 within the magnetic disk device 1 where the magnetic disk device 1 is attached to the swinging tray 40. Also, step A in FIG. 7 shows the state of FIG. 6A seen from the side. In the first embodiment, in the position shown in step A of FIG. 7, the magnets 27 and 28 are arranged in the sliding tray 20 so that the maximum magnetic flux region M of the magnets 27 and 28 is within a range that is one quarter of the diameter of the magnetic disks 5 in the magnetic disk device 1 attached to the swinging tray 40 from the rear end thereof. At this time, the stopper 24 protruding from the side of the sliding tray 20 is in a position where it abuts the end portion at the rear end of a guide groove 37 provided on the inside of the case 31 of the main body 30.

Figure 6B:
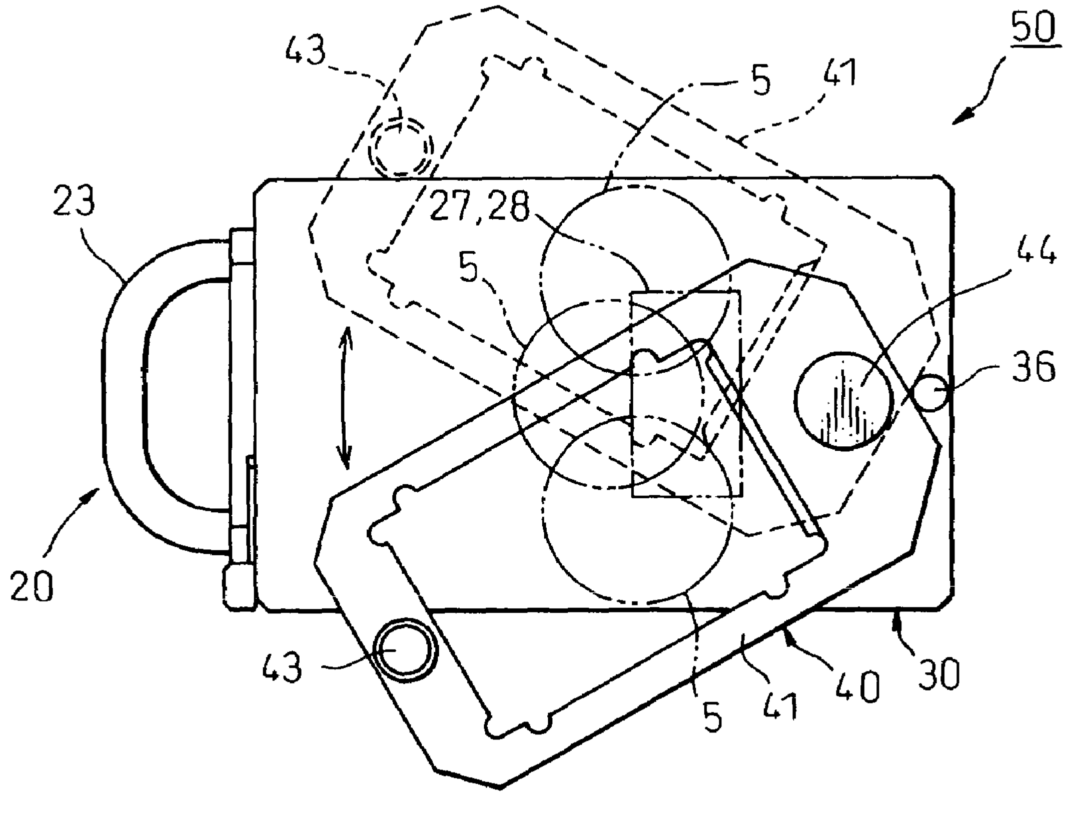
FIG. 6B is a plan view for explaining a state wherein, in the data erasing device shown in FIG. 6A, a swinging tray has been swung to the maximum extent.

As shown in FIG. 6B, when the clip 43 is grasped and the swinging tray swung from a position indicated by the solid lines to the position indicated by the broken lines, the magnetic disks 5 are moved in substantially a right-left direction above the magnets 27 and 28 as indicated by the double-dashed lines. Here, the relative direction of movement of the magnets 27 and 28 as seen from the magnetic disks 5 side is shown in (a) of FIG. 8. As can be understood from this drawing, by swinging the swinging tray in the state shown in step A of FIG. 7, data in a region one quarter of the diameter of the magnetic disks 5 can be erased by the magnets 27 and 28.

Next, from the state of step A of FIG. 7, the latch lever 34 to be described later (refer to FIG. 2, FIG. 3A and FIG. 3B) is released, and the sliding tray 20 is extracted from the case 31 to a distance that exposes the second groove 22 by pulling the handle 23, and is locked by the latch lever 34 in the state of step B of FIG. 7. In this state, the maximum magnetic flux region M of the magnets 27 and 28 is positioned in a range that is one quarter of the diameter of the magnetic disks 5 in the magnetic disk device 1 attached to the swinging tray 40 towards the rear from the center thereof.

Then, in this state, the clip 43 is grasped and the swinging tray 40 swung as described above. The relative movement direction of the magnets 27 and 28 at this time as seen from the magnetic disks 5 side is shown in (b) of FIG. 8. As can be understood from this drawing, by swinging the swinging tray 40 in the state shown in step B of FIG. 7, data in the region that is one quarter of the diameter of the magnetic disks 5 and adjoins the data region of the magnetic disks 5 erased by swinging the swinging tray 40 in the state shown in step A of FIG. 7, can be erased by the magnets 27 and 28.

Further, from the state of step B of FIG. 7, by releasing the latch lever 34 (refer to FIG. 2, FIG. 3A and FIG. 3B) and pulling the handle 23, the sliding tray 20 is extracted from the case 31 by a distance that exposes the third groove 22 from the case 31, and is locked by the latch lever 34 in the state of step C of FIG. 7. In this state, the maximum magnetic flux region M of the magnets 27 and 28 is positioned in a range one quarter of the diameter of the magnetic disks 5 in the magnetic disk device 1 attached to the swinging tray 40 toward the front from the center thereof.

In this state the clip 43 is grasped and the swinging tray 40 swung as described above. The relative movement direction of the magnets 27 and 28 at this time as seen from the magnetic disks 5 side is shown in (c) of FIG. 8. As can be understood from this drawing, by swinging the swinging tray 40 in the state shown in step B of FIG. 7, data in the region that is one quarter of the diameter of the magnetic disks 5 and adjoins the data region of the magnetic disks 5 erased by swinging the swinging tray 40 in the state shown in step B of FIG. 7 can be erased by the magnets 27 and 28.

Finally, from the state of step C of FIG. 7, the latch lever 34 (refer to FIG. 2, FIG. 3A and FIG. 3B) is released and the handle 23 pulled so that the stopper 24 protruding from the side of the sliding tray 20 abuts the front end of the guide groove 37 provided inside the case 31 of the main body 30 and the sliding tray 20 reaches the state shown in step D of FIG. 7. Thus, the fourth groove 22 is exposed from the case 31, and is locked by the latch lever 34. In this state, the maximum magnetic flux region M of the magnets 27 and 28 is positioned in a range one quarter of the diameter of the magnetic disks 5 in the magnetic disk device 1 attached to the swinging tray 40 from the front thereof.

In this state the clip 43 is grasped and the swinging tray 40 swung as described above. The relative movement direction of the magnets 27 and 28 at this time as seen from the magnetic disks 5 side is shown in (d) of FIG. 8. As can be understood from this drawing, by swinging the swinging tray 40 in the state shown in step D of FIG. 7, data in the region that is one quarter of the diameter of the magnetic disks 5 and adjoins the data region of the magnetic disks 5 erased by swinging the swinging tray 40 in the state shown in step C of FIG. 7, can be erased by the magnets 27 and 28.

In this way, the sliding tray 20 is extracted from the case 31 of the main body 30 in 4 stages, and by swinging the sliding tray 40 in each stage, data recorded on the entire surface of the magnetic disks 5 can be erased by small magnets 27 and 28 whose size is one quarter the diameter of the magnetic disks 5. Then, if the magnetic disk device 1 set in the swinging tray 40 is inverted and the above described operation performed in reverse sequence with the sliding tray 20 moving in the direction entering the main body 30, data recorded on the magnetic disks 5 of the magnetic disk device 1 can be even more completely erased.

Figure 9A:
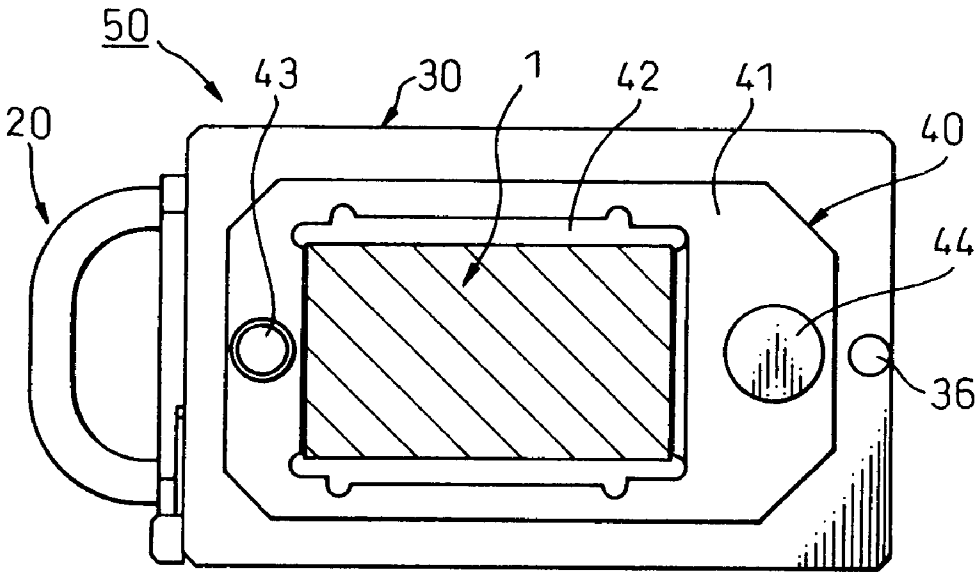
FIG. 9A is a plan view showing a state wherein a magnetic disk is installed in the swinging tray of the data erasing device according to the first embodiment of the present invention.
Figure 9B:
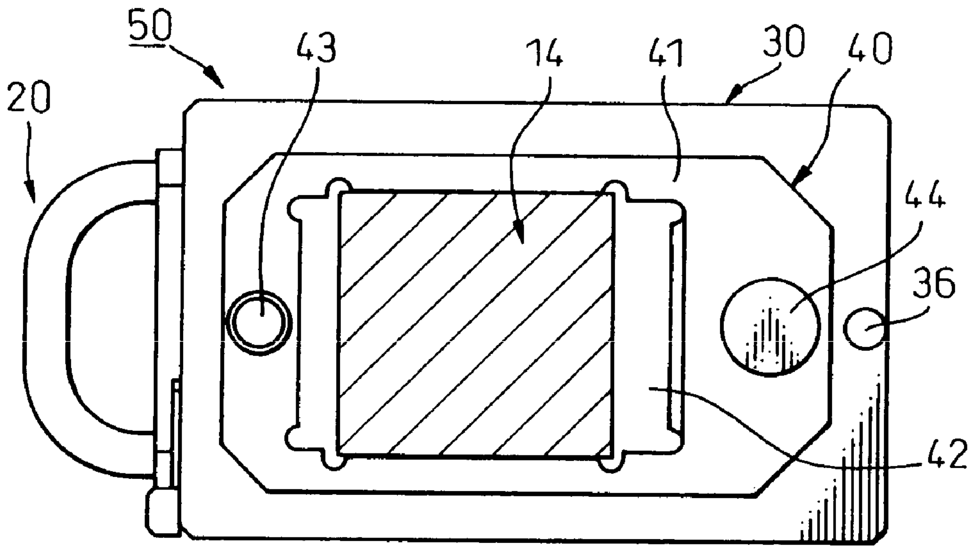
FIG. 9B is a plan view showing a state wherein a magnetic cartridge used by a library device is installed in the swinging tray of the data erasing device according to the first embodiment of the present invention.

In the data erasing device 50 of the first embodiment explained above, as shown in FIG. 9A, an example has been described in which the magnetic disk device 1 is set in the medium housing hole 42 of the sliding tray 40 in the lengthwise direction to delete data recorded on magnetic disks incorporated in the magnetic disk device 1. On the other hand, the length of the medium housing hole 42 in the swinging tray 40 of the data erasing device 50 of the present invention in the widthwise direction is capable of housing another recording medium, for example a magnetic tape cartridge 14 which is a magnetic recording medium utilizing the library device shown in FIG. 9B. In this way, the data erasing device 50 of the present invention can erase data recorded on a number of types of magnetic recording media by means of the shape of the medium housing hole 42 provided in the swinging tray 40. Further, if the pin 44 of the data erasing device 50 of the present invention is capable of protruding from the main body 30 and the swinging tray 40 can be exchanged to match the magnetic recording medium, data erasure of even more types of magnetic recording media can be performed using the data erasing device 50 of the present invention.

Figure 10A:
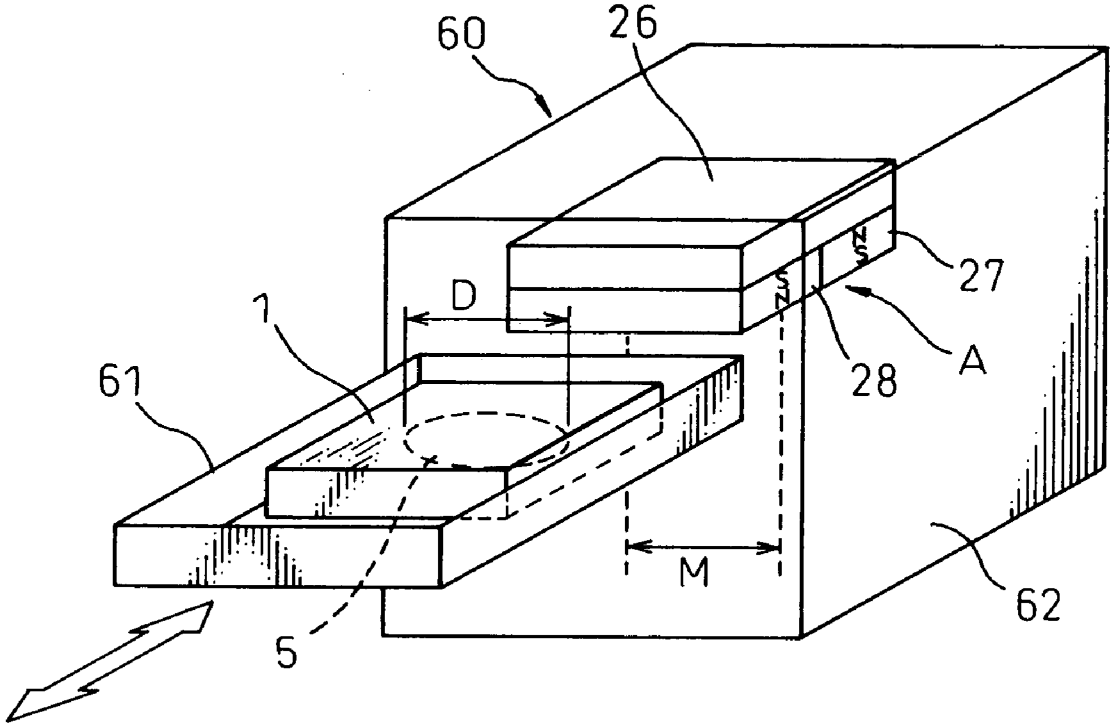
FIG. 10A is a perspective view showing the structure of a first aspect of a data erasing device according to a second embodiment of the present invention.
Figure 10B:
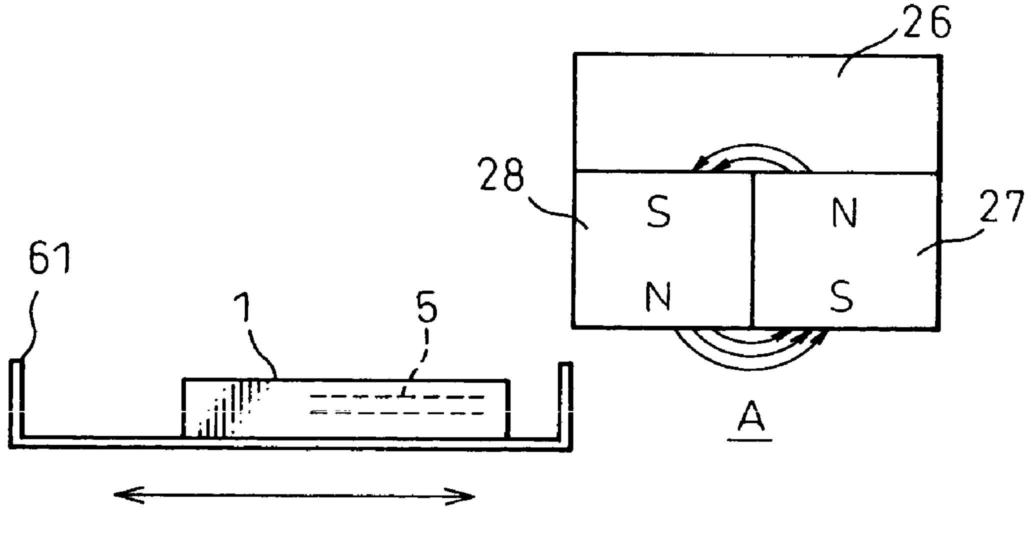
FIG. 10B is a diagram for explaining the principle of erasing data on a magnetic disk device by means of the first aspect of the data erasing device according to the second embodiment of the present invention.

FIG. 10A shows the structure of a first aspect of a data erasing device 60 according to a second embodiment of the present invention, and FIG. 10B illustrates the principle of erasing data from a magnetic disk device 1 by means of this first aspect of the data erasing device 60. The data erasing device 60 of the first aspect of the second embodiment, similarly to the data erasing device 50 of the first embodiment, comprises a case 62 incorporating two magnets 27 and 28 arranged adjacent to each other on a yoke 26, and a drawer-type tray 61 constructed so as to be freely extractable and insertable in the case 62. A magnetic disk device 1 which is the magnetic recording medium whose data is to be erased is mounted on the tray 61 and is extracted and inserted with respect to the case 62.

Also, the yoke 26 is fixed to the ceiling side of the case 62, and the magnets 27 and 28 are arranged in the forward-backward direction with respect to the path of the tray 61 inside the case 62. The widths of the magnets 27 and 28 are formed larger than the width of the magnetic disk device 1. In addition, the magnets 27 and 28 are arranged with the magnet 28 arranged at the entrance side of the case 62 with its south pole at the yoke 26 side and its north pole at the external side and the magnet 27 at the far side from the entrance side of the case 62 with its north pole at the yoke 26 side and its south pole at the external side. Also, the magnetic disk device 1 from which data is to be erased is mounted on this tray 61 so as to be inserted and extracted into and from the case 62.

Further, a magnetic field indicated by the reference symbol A in FIG. 10B is generated inside the case 62 by the magnets 27 and 28 arranged inside the case 62. This magnetic field A is formed by magnetic flux from the magnet 28 to the magnet 27, and the magnetic field A at the border portion of the magnets 27 and 28 has a horizontal component. As the magnets 27 and 28 are arranged at the front of the case 62, with regard to the magnetic field A generated by the magnets 27 and 28, by moving the tray 61 in which the magnetic disk device 1 is mounted into and out of the case 62 at least once, data recorded on the magnetic disks 5 in the magnetic disk device 1 is erased by the magnetic field A.

Thereafter, when the same operation is performed with the magnetic disk device 1 inverted and mounted in the tray 61, data recorded on the magnetic disks 5 in the magnetic disk device 1 is reliably erased by the magnetic field A. In FIG. 10A, the path by which the tray 61 moves in and out of the case 62 and the handle provided on the tray 61 have been omitted.

In the data erasing device 60 of the first aspect of the second embodiment shown in FIG. 10A, the size of the magnets 27 and 28 has been increased and the maximum magnetic flux region M is substantially the same as the diameter D of the magnetic disks 5 in the magnetic disk device 1. Consequently, due to the large sized magnets 27 and 28 the weight of the data erasing device 60 increases, and the cost of the device also increases. In order to solve this problem, as well as decreasing the size of the magnets 27 and 28, the magnets 27 and 28 can be made movable on the case 62 and the number of times that the magnetic disk device 1 is moved into and out of the data erasing device 60 can be increased.

Figure 11A:
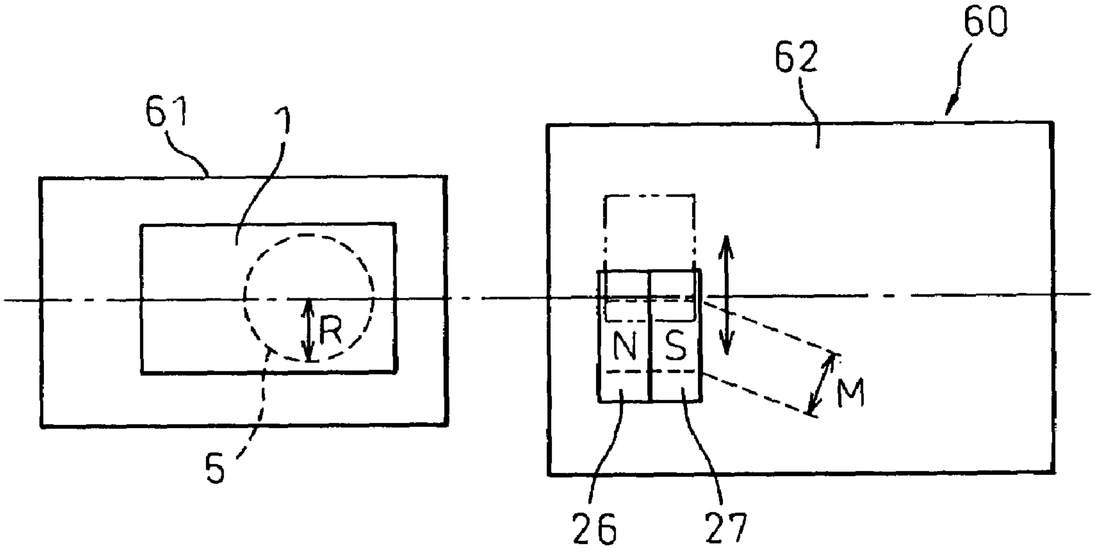
FIG. 11A is a plan view illustrating the structure of a modified example of the first aspect of the data erasing device according to the second embodiment of the present invention.

FIG. 11A illustrates the structure of a modified example of the first aspect of the data erasing device 60 according to the second embodiment of the present invention, in which the size of the magnets 27 and 28 is decreased. In this modified data erasing device 60 the size of the magnets 27 and 28 is small and the maximum magnetic flux region M of the magnets 27 and 28 is substantially the same as the radius R of the magnetic disks 5 in the magnetic disk device 1. In addition, the magnets 27 and 28 can be moved from a position indicated by the solid lines to a position indicated by the double-dashed lines in FIG. 11A.

Figure 11B:
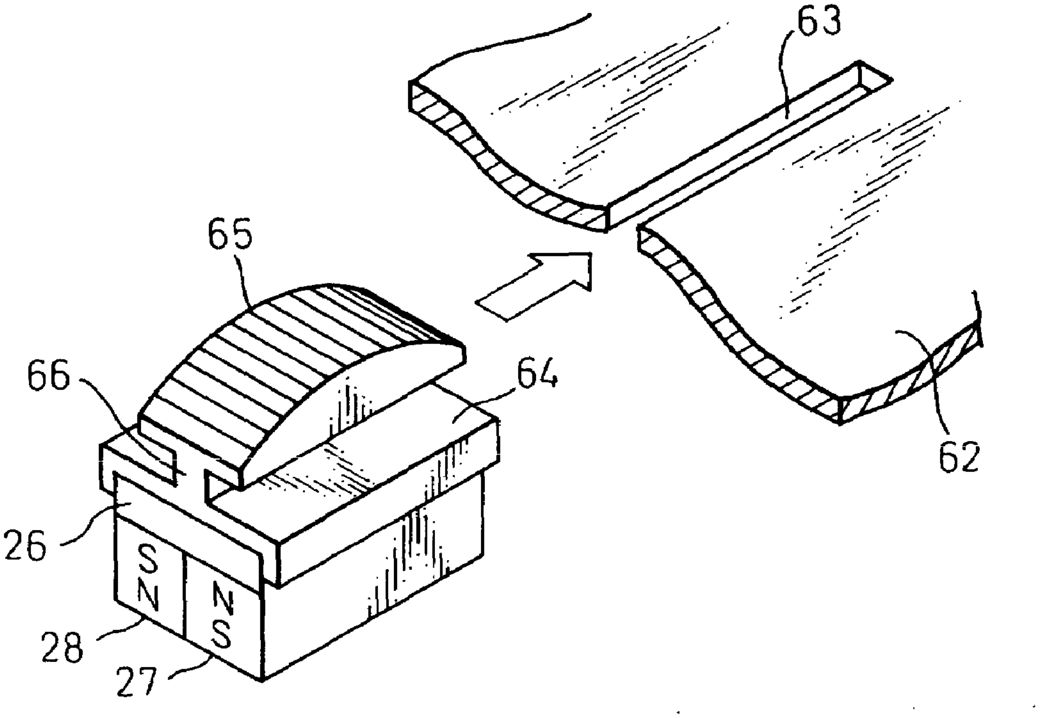
FIG. 11B is a perspective view showing an example of the structure of a slide mechanism for the magnets used in the data erasing device shown in FIG. 11A.

FIG. 11B shows an example of a slide mechanism for the magnets 27 and 28 shown in FIG. 11A. The yoke 26 portion of the magnets 27 and 28 is held in a holder 64, and a knob 65 having a slide portion 66 protrudes from this holder 64. In addition, a groove 63 is provided on the upper surface of the case 62 of the data erasing device 60, and the slide portion 66 of the knob 65 is inserted into this groove 63. The groove 63 is provided in a direction perpendicular to the insertion direction of the tray 61 into the case 62. By means of this groove 63, the magnets 27 and 28 can be moved from the position indicated by the solid lines to the position indicated by the double-dashed lines in FIG. 11A by operating the knob 65. An explanation of the fixing mechanism of the magnets 27 and 28 is omitted here.

Also, although up to now embodiments in which the yoke 26 and magnets 27 and 28 are attached to the ceiling side of the case 62 have been described, the yoke 26 and magnets 27 and 28 can also be attached to the bottom of the case 62.

Using the modified example of the data erasing device 60 of the first aspect of the second embodiment, the method for completely erasing data recorded on magnetic disks 5 of the magnetic disk device 1 is, for example, as described below.

(1) The magnets 27 and 28 are fixed in the position indicated by the solid lines in of FIG. 11A.

(2) The magnetic disk device 1 is mounted in an upright state in the tray 61, and moved inwards and outwards with respect to the data erasing device 60 a predetermined number of times.

(3) The magnetic disk device 1 is loaded into the tray 61 in an inverted state, and moved inwards and outwards with respect to the data erasing device 60 a predetermined number of times.

(4) The magnets 27 and 28 are moved to the position indicated by the double-dashed lines in FIG. 11A then fixed in that position.

(5) With the magnetic disk device 1 in the inverted state on the tray 61, the tray 61 is moved inwards and outwards with respect to the data erasing device 60 a predetermined number of times.

(6) After returning the magnetic disk device 1 to an upright state on the tray 61, the tray 61 is moved inwards and outwards with respect to the data erasing device 60 a predetermined number of times.

Figure 12A:
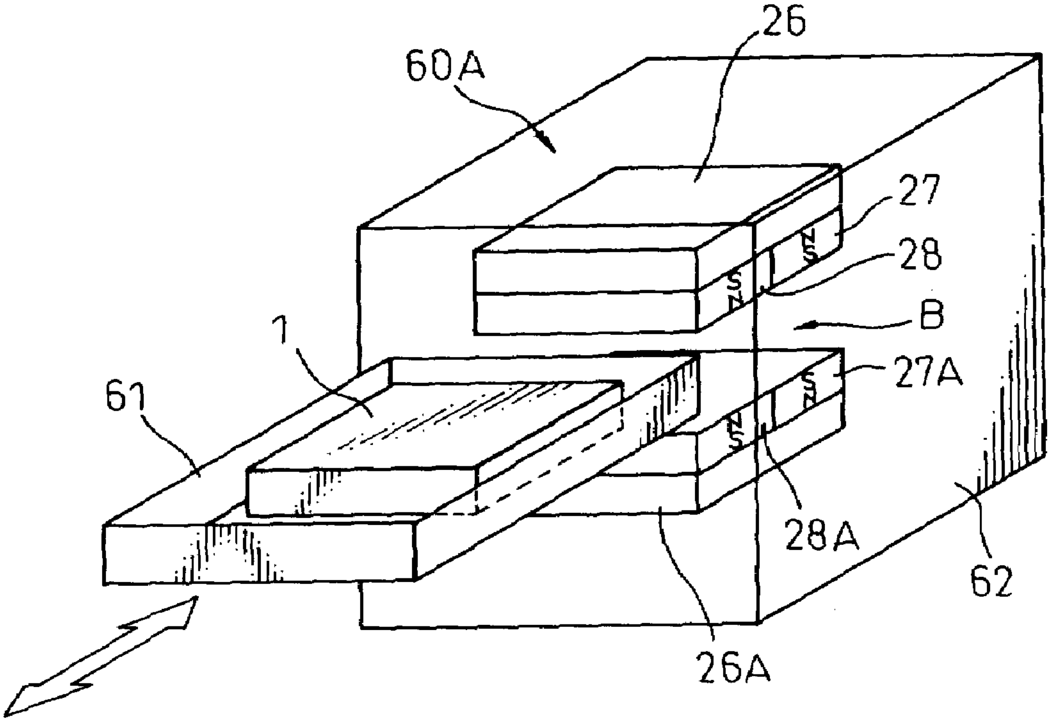
FIG. 12A is a perspective view showing the structure of a second aspect of the data erasing device according to the second embodiment of the present invention.
Figure 12B:
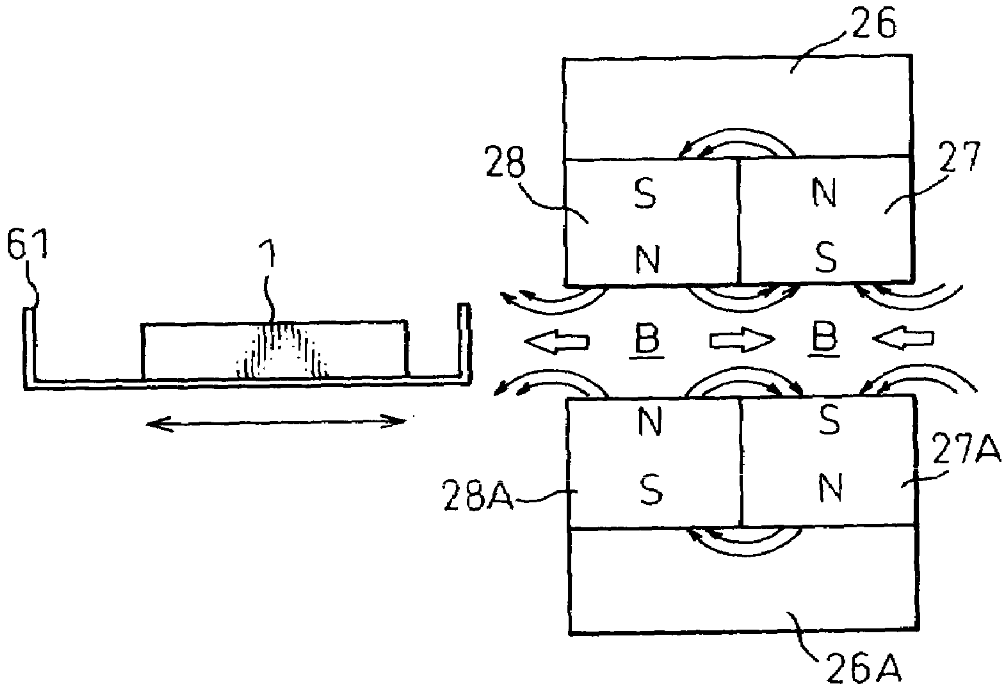
FIG. 12B is a diagram for explaining the principle of erasing data in a magnetic disk device by means of the second aspect of the data erasing device according to the second embodiment of the present invention.

FIG. 12A shows the structure of a second aspect of the data erasing device 60A according to the second embodiment of the present invention. Also, FIG. 12B illustrates the principle of erasing data in a magnetic disk device 1 by means of this second aspect of the data erasing device 60A. The data erasing device 60A of the second aspect of the second embodiment, in addition to the structure of the data erasing device 60 of the first aspect of the second invention, differs in having one more set of magnets 27 and 28 arranged next to each other on a yoke 26 incorporated in the case 62. The structure of the drawer-type tray 61, constructed so as to be freely movable inwards and outwards with respect to the case 62, is the same as that of the first aspect.

The second set of magnets 27A and 28A are constructed in planar symmetry to the magnets 27 and 28 attached to the ceiling portion of the case 62, with respect to the path of the tray 61 within the case 62. Also, the widths of the magnets 27 and 28 and magnets 27A and 28A are the same and they are formed larger than the width of the magnetic disk device 1. Among the magnets 27 and 28 and magnets 27A and 28A, the magnets 28 and 28A whose south poles are on the yoke 26 and 26A sides and north poles are on the external sides are arranged toward the entrance of the case 26, and the magnets 27 and 28A whose north poles are on the yoke 26 and 26A sides and south poles or on the external sides are arranged on the far side from the entrance of the case 62. Also, the magnetic disk device from which data is to be erased is moved inward and outward with respect to the case 62.

Also, magnetic fields indicated by the reference symbol B in FIG. 12B are generated in the case 62 by the magnets 27 and 28 and magnets 27A and 28A arranged within the case 62. These magnetic fields B are formed by the magnetic flux from the magnet 28 to the magnet 27 and the magnetic flux from the magnet 28A to the magnet 27A, and the magnetic fields B at the boundary portions of the magnets 27 and 28 and the boundary portions of the magnets 27A and 28A have horizontal components. As the magnets 27 and 28 and magnets 27A and 28A are arranged toward the front of the case 62, with regard to the magnetic field B thus generated, by moving the tray 61 in which the magnetic disk device 1 it is mounted inward and outward with respect to the case 62 at least once, the data recorded on the magnetic disks 5 in the magnetic disk device 1 is erased by this magnetic field B.

In the data erasing device 60A of the second aspect of the second embodiment, because the magnetic disk device 1 moves along the path between where the magnets 27 and 28 and the magnets 27A and 28A and are arranged in planar symmetry, and the magnetic fields B exist above and below the magnetic disk device 1, there is no necessity for inverting the magnetic disk device 1 mounted on the tray 61 and repeating the same operation. In FIG. 12A, the path for inserting and extracting the tray 61 into and from the case 62 and the handle provided on the tray 61 have been omitted from the drawing.

In the data erasing device 60A of the second aspect of the second embodiment shown in FIG. 12A, the size of the magnets 27 and 28 and magnets 27A and 28A is large. Consequently, the maximum magnetic flux region M of the magnets 27 and 28 and magnets 27A and 28A is substantially the same as the diameter D of the magnetic disks 5 in the magnetic disk device 1. Thus, in the data erasing device 60A of the second aspect of the second, as in the modified example of the first aspect of the data erasing device 16, it is possible to decrease the size of the magnets 27 and 28 and magnets 27A and 28A, and make the magnets 27 and 28 and magnets 27A and 28A movable in the case 62, thereby reducing the device cost.

Figure 13A:
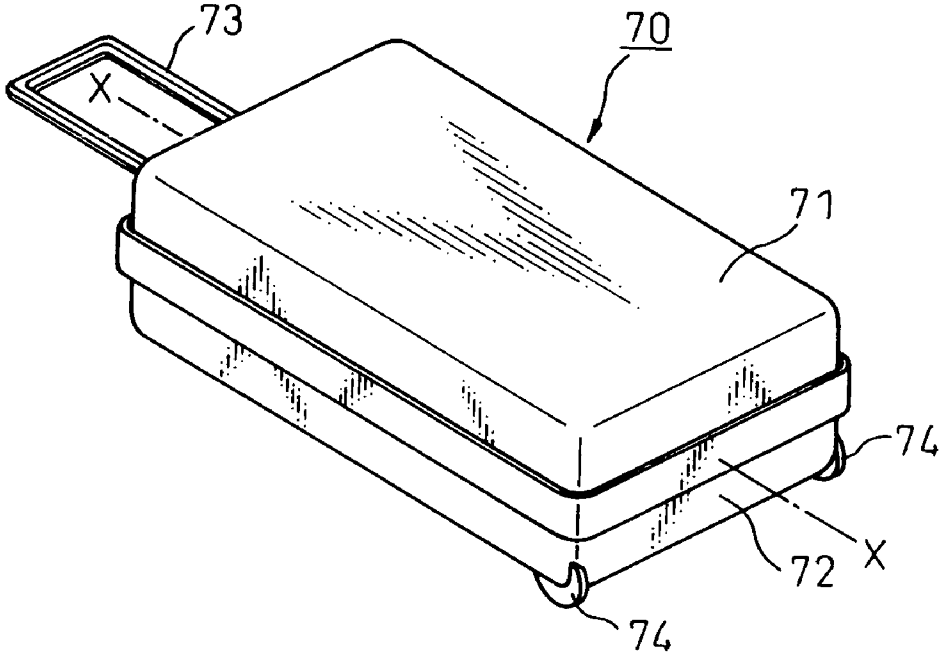
FIG. 13A is a perspective view of the exterior of the data erasing device built into the carrying case for transporting the data erasing device, which is a third embodiment of the present invention.
Figure 13B:
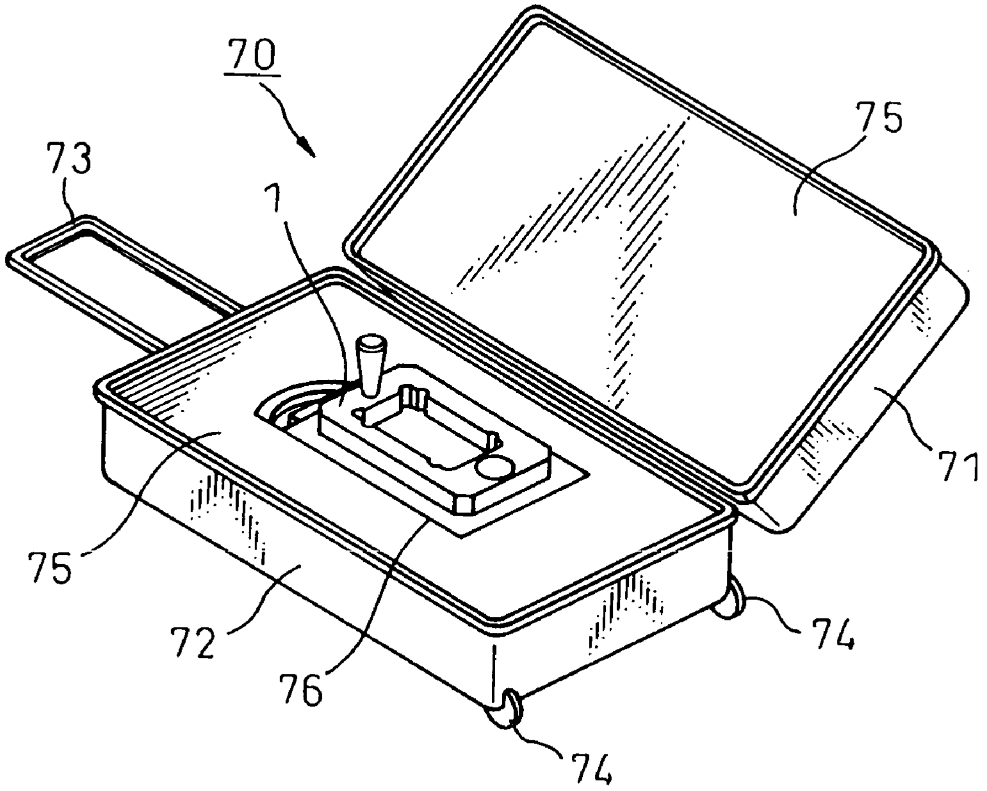
FIG. 13B is a perspective view showing a state wherein the data erasing device of the first embodiment of the present invention is housed in the carrying case shown in FIG. 13A.

FIG. 13A shows a third embodiment, of the present invention, in which a carrying case 70 for transporting a data erasing device is attached to the data erasing device 50, 60 and 60A described above. The carrying case 70 is constructed from an upper case 71 that is capable of being opened and closed, a lower case 72, a handle 73 that is contractable and extendable to and from the lower case 72, and casters 74 attached to the bottom of the lower case 72. Inside this carrying case 70, as shown in FIG. 13B, a cushioning material 75 is inserted and a storage hole 76 is formed in the portion in which the data erasing device 50, 60 or 60A is to be housed. The cushioning material 75 is for restraining the data erasing device 50, 60 or 60A stored in the carrying case 70 from the top side and the bottom side there of, thus fixing it firmly within the carrying case 70

Figure 14A:
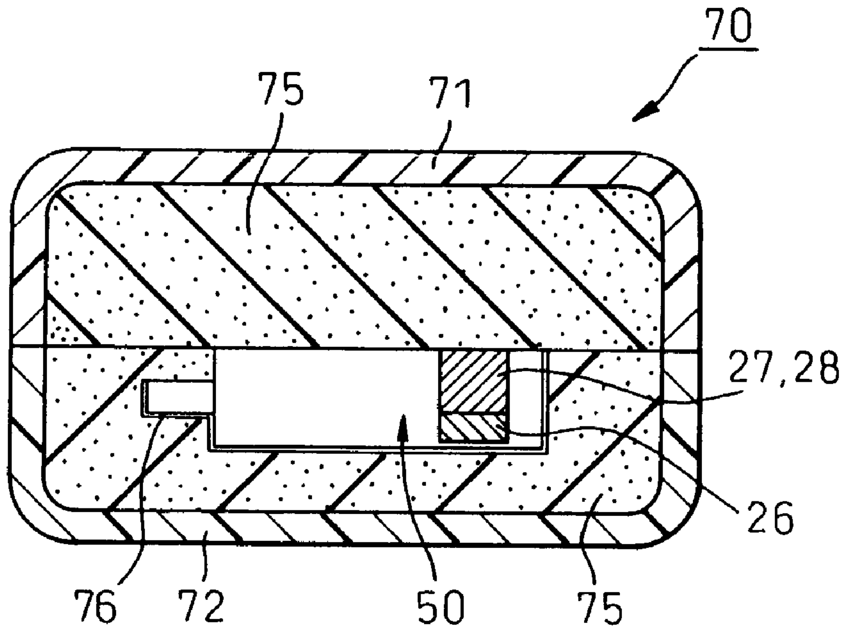
FIG. 14A is a sectional view along the line X-X of FIG. 13A.

FIG. 14A shows a sectional view along the line X—X of FIG. 13A. This drawing shows a state where the data erasing device 50 of the first embodiment is incorporated in the carrying case 70. As previously described, because the yoke 26 is provided below the magnets 27 and 28 incorporated in the data erasing device 50, there is no possibility of the magnetic flux emitted from the magnets 27 and 28 leaking to the outside from the lower case 72 of the carrying case 70. On the other hand, because a yoke 26 is not provided above the magnets 27 and 28 incorporated in the data erasing device 50, there is a possibility of the magnetic flux emitted by the magnets 27 and 28 leaking to the outside from the upper case 71 of the carrying case 70. Thus, in the present embodiment the thickness of the upper case 71 of the carrying case 70 is increased to prevent leakage to the outside of the magnetic flux emitted by the magnets 27 and 28 from the upper case 71 of the carrying case 70.

Figure 14B:
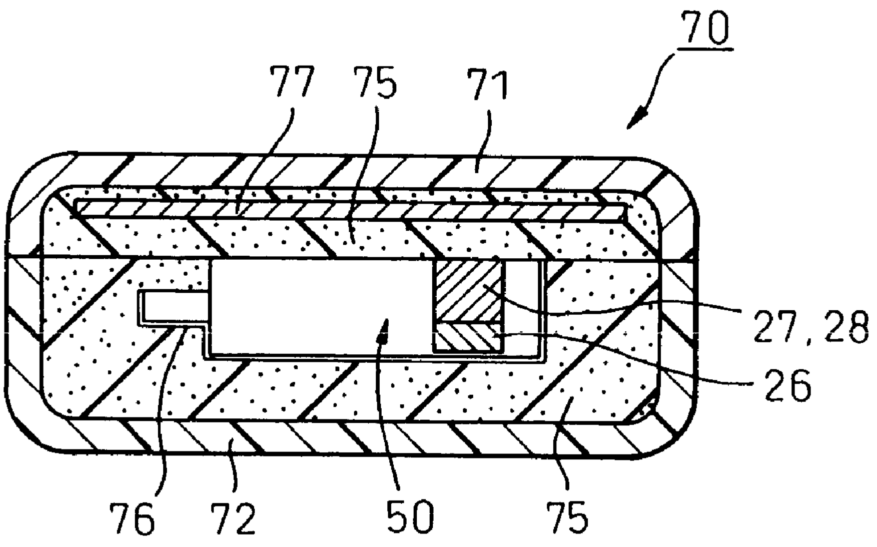
FIG. 14B is a sectional view showing an example of a modification of the same part of the structure shown in FIG. 14A.

FIG. 14B shows a sectional view of another embodiment of the same portions along the line X—X of FIG. 13A, in a state incorporating the data erasing device 50 of the first embodiment. In this embodiment, a magnetic shield plate 77 constructed from a ferromagnetic material is provided in the cushioning material 75 provided in the upper case so that the magnetic flux generated by the magnets 27 and 28 does not leak to the outside from the upper case 71 of the carrying case 70. As the ferromagnetic material, specifically, a steel type material, permalloy, silicon steel plate, or the like can be used. By means of this magnetic shield plate 77, because the possibility of the magnetic flux emitted by the magnets 27 and 28 leaking to the outside from the upper case 71 of the carrying case 17 has been eliminated, the thickness of the upper case 71 of the carrying case 70 can be reduced in the present embodiment.

Although, as examples of a magnetic recording medium from which data is erased by the data erasing device 50, 60 or 60A, a magnetic disk device (hard disk device) 1 and a magnetic tape cartridge 14 have been described in the above embodiments, the magnetic recording medium from which data is erased by the data erasing device 50, 60 or 60A of the present invention is not necessarily limited thereto.

What is claimed is:

1. A data erasing device for erasing data recorded on a magnetic recording medium using a magnetic field generated from permanent magnets, comprising:

a main body case for housing a magnetic recording medium on an upper surface;

a magnetic field generating source formed by arranging two permanent magnets each having one of a north pole and a south pole above a ferromagnetic plate so that they have mutually attracting polarities;

a first transferring member that can move the magnetic field generating source in a predetermined direction inside the main body case; and a second transferring member that can move a magnetic recording medium in a direction substantially perpendicular to a movement direction of the magnetic generating source on the upper surface of the main body case.

2. The data erasing device of claim 1, wherein:

the magnetic field generating source is provided in the first transferring member with the ferromagnetic plate underneath so that a generated magnetic field extends beyond the upper surface of the body case into the space above;

the first transferring member is stepwise and movably attached to the main body case with respect to the main body case so that the magnetic field is applied uniformly within a predetermined range at the upper surface of the main body case;

the second transferring member is constructed and comprises a frame that can house the magnetic recording medium in its central portion in a state where the magnetic recording medium is supported on the upper surface of the main body case, one end of the frame being rotatably fixed to the upper surface of the main body case by means of a rotation shaft; and the second transferring member swings around the rotation shaft in a state where a magnetic recording medium is housed in the frame, and after the second transferring member has swung a predetermined number of times, the position of the first transferring member sequentially changes stepwise and at each step the second transferring member swings only the predetermined number of times.

3. The data erasing device of claim 2, wherein a handle for easily transporting the first transferring member is provided at an end of the first transferring member furthest from the main body case.

4. The data erasing device of claim 2, wherein grooves are provided at predetermined intervals on the upper surface of the first transferring member and a latch lever is provided in the main body case for engaging with the grooves and suspending movement of the first transferring member.

5. The data erasing device of claim 2, wherein a stopper provided the side of the first transferring member, and a guide groove is provided on an inner surface of the main body case for receiving the stopper and defining a movement limit the first transferring member.

6. The data erasing device of claim 2, wherein sizes of the permanent magnets are such that a length of a maximum magnetic flux thereof is less than a length of a data erasing limit of the magnetic recording medium housed in the frame, and a number and interval of the grooves are determined by the length of the maximum magnetic flux of the permanent magnets and the length of the data erasing limit of the magnetic recording medium.

7. The data erasing device of claim 6, wherein the magnetic recording medium is a magnetic disk device, the length of the maximum magnetic flux of the permanent magnets is set at one quarter of a diameter of magnetic disks incorporated in the magnetic disk device, the number of the grooves is four, and the interval between the grooves is equal to the length of the length of the maximum magnetic flux of the permanent magnets.

8. The data erasing device of claim 2, wherein a stopper is provided on the upper surface of the main body case defining a swing limit of the second transferring member.

9. The data erasing device of claim 2, wherein a clip is provided protruding from an end of the frame opposite the end at which the rotation shaft is provided, for easily swinging the frame.

10. The data erasing device of claim 2, wherein a shape of medium housing hole in a central portion of the frame housing the magnetic recording medium is a shape capable of housing a variety of types of magnetic recording media.

11. The data erasing device of claim 2, wherein the frame is exchangeable with another frame with a different shaped medium housing hole for housing another magnetic recording medium.

12. A data erasing device for erasing data recorded on a magnetic recording medium using a magnetic field generated from permanent magnets, comprising:

a first magnetic field generating source formed by arranging two permanent magnets each having one of a north pole and a south pole above a ferromagnetic plate so that they have mutually attracting polarities;

a main body case in which the magnetic field generating source is internally attached to the ferromagnetic plate with the ferromagnetic plate an upper surface side;

a path provided in the main body case perpendicular to the magnetic field generated by the magnetic field generating source, having a space capable of accommodating the entire magnetic recording medium; and a tray that is of a size that, as well as being able to house the magnetic recording medium, can reciprocally move within the main body case along the path.

13. The data erasing device of claim 12, wherein the first magnetic field generating source is constructed to be movable in a direction perpendicular to a central axis of the path.

14. The data erasing device of claim 12, wherein a second magnetic field generating source is provided in the main body case under the first magnetic field generating source facing the first magnetic field generating source across the path, the second magnetic field generating source having magnets and a ferromagnetic plate, and wherein the magnets and the ferromagnetic plate of the second magnetic field generating source are arranged planarly symmetric to the central axis of the path.

15. The data erasing device of claim 1, further comprising a portable carrying case, the carrying case comprising:

a lower case including handles in an upper portion thereof;

an upper case that can cover the lower case;

a cushioning material packed into the upper case and the lower case; and an indented portion provided in the cushioning material inside the lower case, capable of housing the data erasing device.

16. The data erasing device of claim 15, wherein a magnetic shield plate for preventing leakage to the outside of the carrying case of a magnetic flux generated from the data erasing device is provided in the upper case.

17. A data erasing device for erasing data recorded on a magnetic recording medium using a magnetic field generated from permanent magnets, comprising:

a main body case for housing a magnetic recording medium on an upper surface;

a magnetic field generating source formed by arranging two permanent magnets each having one of a north pole and a south pole above a ferromagnetic plate so that they have mutually attracting polarities;

a first transferring member that can move the magnetic field generating source in a predetermined direction inside the main body case; and a second transferring member that can move a magnetic recording medium in a direction substantially perpendicular to a movement direction of the magnetic generating source on the upper surface of the main body case, wherein:

the magnetic field generating source is provided in the first transferring member with the ferromagnetic plate underneath so that a generated magnetic field extends beyond the upper surface of the body case into the space above;

the first transferring member is stepwise and movably attached to the main body case with respect to the main body case so that the magnetic field is applied uniformly within a predetermined range at the upper surface of the main body case;

the second transferring member is constructed and comprises a frame that can house the magnetic recording medium in its central portion in a state where the magnetic recording medium is supported on the upper surface of the main body case, one end of the frame being rotatably fixed to the upper surface of the main body case by means of a rotation shaft; and the second transferring member swings around the rotation shaft in a state where a magnetic recording medium is housed in the frame, and after the second transferring member has swung a predetermined number of times, the position of the first transferring member sequentially changes stepwise and at each step the second transferring member swings only the predetermined number of times.

* * * * *